No. 717,345. Patented Dec. 30, 1902.
J. W. CARNOCHAN.
MACHINE FOR THRESHING PEAS, BEANS, &c.
(Application filed Dec. 14, 1901.)
(No Model.) 3 Sheets—Sheet 3.
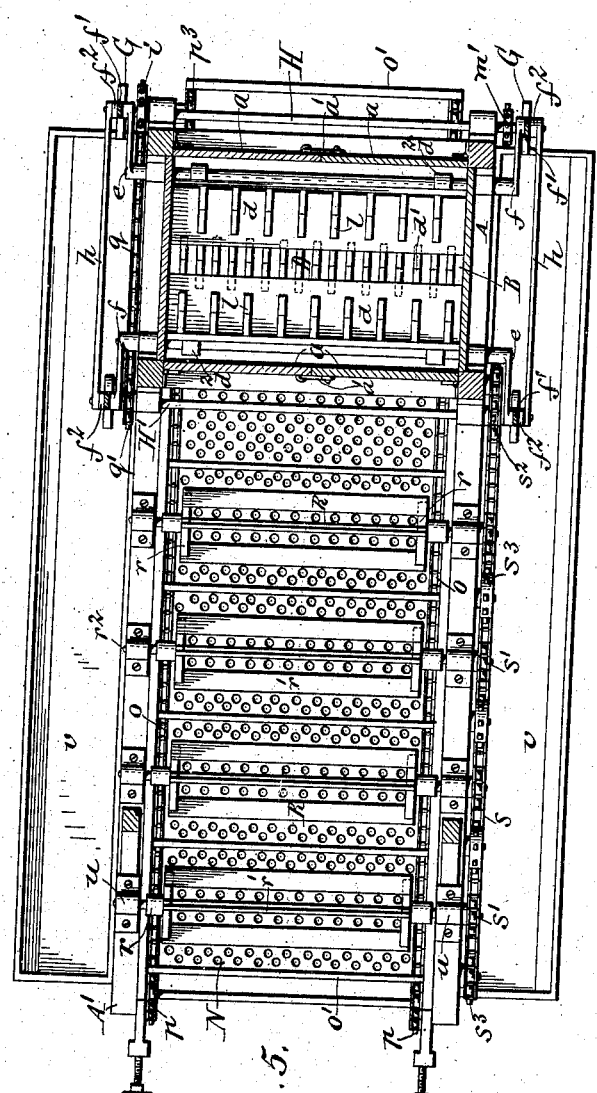
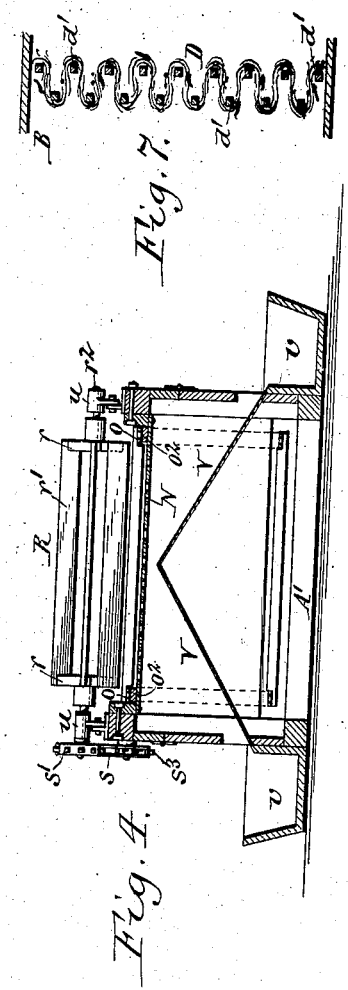
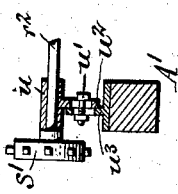
Witnesses:
Louis W. Gratz
Emma M. Graham
John W. Carnochan Inventor
By Geyer & Popp,
Attorneys

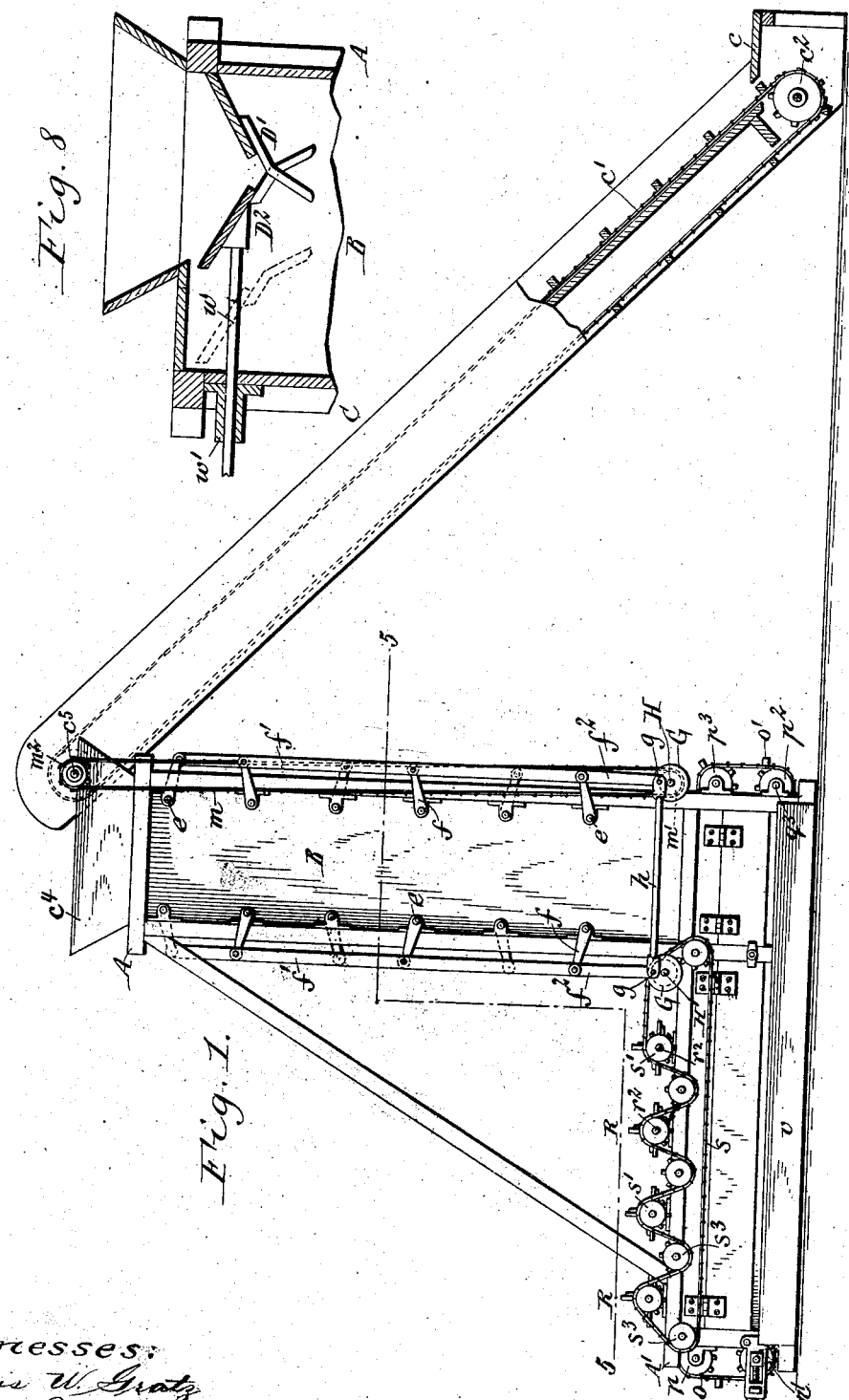

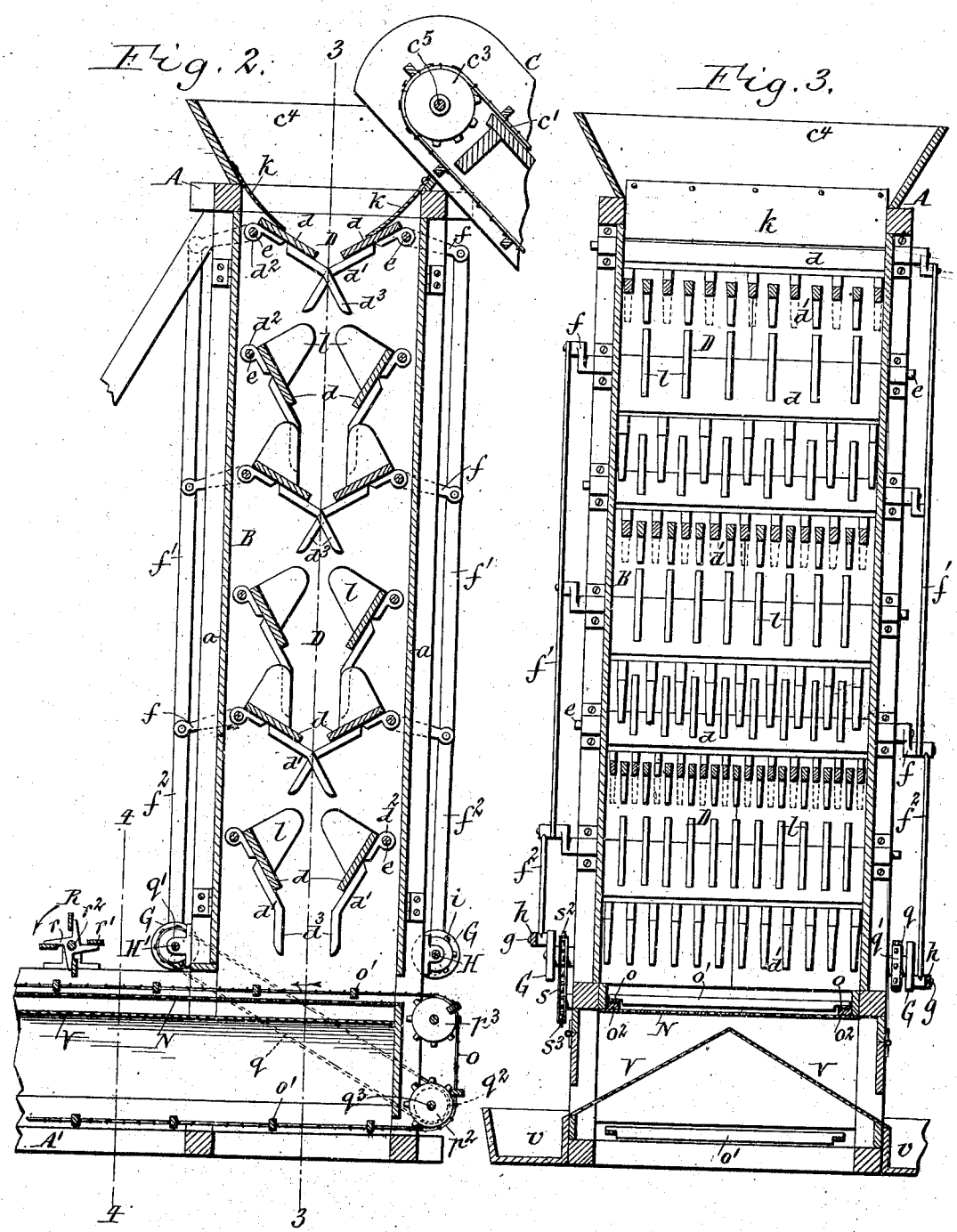

UNITED STATES PATENT OFFICE.

JOHN W. CARNOCHAN, OF SILVERCREEK, NEW YORK, ASSIGNOR TO HUNTLEY MANUFACTURING COMPANY, OF SILVERCREEK, NEW YORK, A CORPORATION OF NEW YORK.

MACHINE FOR THRESHING PEAS, BEANS, &c.

SPECIFICATION forming part of Letters Patent No. 717,345, dated December 30, 1902.

Application filed December 14, 1901. Serial No. 85,986. (No model.)

*To all whom it may concern:*

Be it known that I, JOHN W. CARNOCHAN, a citizen of the United States, residing at Silvercreek, in the county of Chautauqua and State of New York, have invented new and useful Improvements in Machines for Threshing Peas, Beans, &c., of which the following is a specification.

This invention relates more especially to a machine for threshing peas, beans, &c., while the same are still in the pods and on the vines.

The object of my invention is the production of a machine for this purpose which will thoroughly and expeditiously thresh and separate the maximum amount of peas from the vines and which will not reduce the value of the product by crushing or splitting the same.

In the accompanying drawings, consisting of three sheets, Figure 1 is a side elevation, partly in section, of my improved threshing-machine. Fig. 2 is a vertical longitudinal section, on an enlarged scale, of the threshing mechanism and connecting parts. Figs. 3 and 4 are vertical transverse sections in lines 3 3 and 4 4, Fig. 2. Fig. 5 is a horizontal section, on an enlarged scale, in line 5 5, Fig. 1. Fig. 6 is a fragmentary vertical section of one of the tedder-bearings. Fig. 7 is a fragmentary horizontal section showing the action of the beaters on the vines. Fig. 8 is a fragmentary section showing a modification of the threshing devices.

Like letters of reference refer to like parts in the several figures.

The main frame of the machine consists of an upright front portion A and a horizontal lower portion A', which extends rearwardly from the lower end of the front portion.

B represents a vertical chamber containing the threshing mechanism. The vines to be threshed are delivered into the open top or inlet end of this threshing-chamber and descend through the latter by gravity. During their descent the vines are acted upon by the threshing mechanism and finally issue from the open lower end or outlet of the chamber. The vines may be elevated to the top of the threshing-chamber by any suitable means, preferably by an elevator consisting, essentially, of an inclined leg or trough C, extending from a feed-table $c$ on the ground to the top of the threshing-chamber, and an endless conveyer $c'$, which passes around supporting-wheels $c^2 c^3$ at the receiving and delivery ends of the trough, as shown in Fig. 1. The vines are discharged from the upper or delivery end of the elevator into a hopper $c^4$ at the upper end of the threshing-chamber.

The mechanism by which the vines are threshed while descending through the threshing-chamber is constructed as follows: D represents a plurality of comb-shaped beaters or vibratory threshing members between which the vines are threshed and which are arranged in sets or pairs, the several pairs being arranged one below another in the threshing-chamber. Each of these beaters consists of an inwardly-inclined guide-board or plate $d$, arranged transversely in the chamber and provided at its inner edge with an inwardly and downwardly projecting comb or series of teeth $d'$. Each guide-board is provided at its outer edge with eyes $d^2$, which are secured to a transverse rock-shaft $e$. The latter extends through the side walls of the threshing-chamber and is journaled in bearings on the upright front portion of the main frame. The two beaters of the same set or pair are arranged horizontally opposite each other, and the teeth of each beater are arranged to enter between those of the opposing beater. The vibration of the beaters of each pair is so determined that the opposing teeth pass one another during the approaching movement of the beaters and are wholly separated to form a clear vertical passage or throat between the same when the beaters recede. The upper or body portions of the opposing teeth incline toward the discharge throat or passage formed between the same when they recede, while the free lower portions of the teeth are deflected downwardly at an angle to their upper portions, as shown at $d^3$. By this construction the lower or active portions of the teeth are arranged approximately parallel with said discharge-throat, thereby compressing the vines between the front sides of the opposing teeth during the approaching movement of the beaters. In closing together the beater-teeth bend the vines into wavy or sinuous form, as shown in Fig. 7, while upon receding they release the vines and permit them to drop upon the next lower set of beaters, which latter upon closing together bend the vines in the same manner. By this action of the beaters the vines are alternately bent and compressed and permitted to relax, and this operation is repeated by the several pairs of beaters as the vines descend through the machine, thereby subjecting the vines to an effective threshing or beating action, by which the pods are split open and the peas or other contents are liberated. During the time that the opposing beaters are separated they incline at a considerable angle, causing the vines to slide down between the same.

By arranging the teeth of the opposing beaters so that they pass each other the peas are freed solely by the bending or kneading action of the teeth on the vines and pods, thereby avoiding all liability of crushing or splitting the peas, which would be liable to occur if the teeth of the two opposing beaters were arranged to come into actual contact.

The actuating mechanism of the several pairs of beaters is so constructed and arranged that the beaters of alternating pairs are closed or moved toward each other while the beaters of the remaining pairs are opened or moved away from each other. By this means the beaters of a pair are closed upon the vines while those of the next lower pair are opened to receive the vines from the beaters above the same. The vines are thus caused to drop step by step through the threshing-chamber, thereby retarding their movement through the several sets of beaters or threshing members and preventing the same from escaping before the beaters have acted effectively upon the same.

As shown in the drawings, one half of the several sets of beaters is operated from an actuating mechanism arranged on one side of the threshing-chamber and the other half by an actuating mechanism arranged on the other side of the threshing-chamber. Each of the beater-shafts is provided outside of the threshing-chamber with a rock-arm $f$, and the rock-arms of one half of the beaters, which work simultaneously, are arranged on one side of the threshing-chamber, while the rock-arms of the other half of the beaters are arranged on the opposite side of said chamber.

The several rock-shafts located on the same side of the threshing-chamber and operated in unison are connected by a bar $f'$, and the lowermost rock-arm of each of these groups is connected by a link $f^2$ with a crank $g$ on a disk G. On the front and rear sides of the lower portion of the threshing-chamber are journaled two transverse driving or crank shafts H H', each of which carries at its opposite ends the two disks which operate the beaters on the same side of the threshing-chamber. The cranks on the corresponding ends of the crank-shafts H H' are located at like points and connected by a rod $h$, and the cranks at the opposite ends of these shafts are arranged at like points, but diametrically opposite those of the first-mentioned cranks. By this construction and arrangement all of the cranks turn together; but the cranks on the corresponding ends of the shafts operate to close alternate sets of beaters, while the cranks at the opposite ends of the shafts operate to open the remaining sets of beaters. The beater-operating mechanism may be driven in any suitable manner—for instance, as shown in the drawings, by means of a sprocket-wheel $i$, arranged on the front driving-shaft H and receiving motion from a chain belt.

The guide-boards $d$ of the beaters are separated at their rear edges from the adjacent walls of the threshing-chamber to permit freedom of action, and in order to prevent any vines from passing downwardly through the spaces between the boards of the uppermost beaters and the front and rear walls of the threshing-chamber two flexible shields or aprons $k$ $k$ are arranged across these spaces and secured at their upper edges to the hopper $c^4$, their free lower portions resting loosely on the uppermost guide-boards. By deflecting the free ends of the beater-teeth downwardly, as shown, the tendency of the teeth to lift the vines is reduced and the teeth exert a greater lateral pressure against the vines than they would if their free ends were in line with the shanks or body portions, thereby obtaining the maximum kneading or threshing effect of the teeth. This construction of the teeth also permits the same to fully clear the throat or passage for the vines without requiring an undue movement of the beaters.

Before the vines are threshed they are comparatively stiff and do not bend so readily as they do after undergoing a partial threshing. In order to cause the vines to be threshed with gradually-increasing vigor as they pass through the threshing-chamber, the teeth of the beaters at the receiving end of the chamber are spaced or separated a greater distance apart than those of the beaters at the delivery end of the threshing-chamber, the spaces between the teeth being preferably reduced gradually and progressively from the uppermost to the lowermost beaters, as shown in Fig. 3. By this arrangement of the teeth the vines upon entering the threshing-chamber are first bent into waves, the turns of which are comparatively long, producing a gentle threshing effect, and the vines are then bent with successively shorter turns, whereby a more vigorous threshing action is produced for effectually opening the pods and releasing the peas. By thus graduating the threshing action of the beater-teeth the work is distributed more uniformly over the several beaters and the highest efficiency of the same is obtained. By arranging the teeth successively closer from the inlet toward the outlet of the threshing-chamber the places of bending the vines are shifted from one portion of the vines to another, and the threshing action of the teeth is increased accordingly.

For the purpose of preventing the vines from becoming caught on the beater-teeth and clogging the same strippers or clearing-teeth $l$ are provided. A series of these strippers is arranged in a transverse row on the upper side of each guide-board $d$, except the uppermost, and opposite the spaces between the teeth of the beater next above the same. These strippers are so arranged that when a pair of beaters is opened the closing movement of the next lower pair of beaters causes the strippers of the latter to pass between the teeth of the respective upper beaters and detach any vines adhering thereto. In the extreme open and closed positions of two adjacent sets of beaters the strippers of the lower set are so located that their inner edges are flush with the working faces of the upper-beater teeth, as shown in Fig. 2, thereby freely discharging the vines from one pair of beaters, to the pair next below. The front ends of the strippers are preferably rounded to shed the vines which might otherwise catch thereon.

In order to afford convenient access to the interior of the threshing-chamber for cleaning and repairs, its front and rear walls are made in sections $a$, which are hinged to the main frame and normally held in a closed position by catches $a'$.

The elevator $c'$ is preferably driven from the beater-operating mechanism by a chain belt $m$, passing around sprocket-wheels $m'$ $m^2$ on the front driving-shaft H, and the shaft $c^5$ carrying the delivery-wheels $c^3$ of the elevator, as shown in Fig. 1.

After the vines have been threshed they are delivered to a separator, whereby the peas or beans, &c., which have been detached or liberated, are separated from the vines and pods. This separator is preferably constructed as follows: N represents a stationary horizontal screen having its receiving end arranged underneath the open lower end of the threshing-chamber B and extending rearwardly along the top of the horizontal portion of the main frame to which it is secured. This screen preferably consists of sheet metal and has perforations of a size to permit the passage of only the peas or beans. As the threshed vines issue from the lower end of the threshing-chamber they drop upon the receiving end of this separating-screen and are thence carried over the screen to the tail end thereof by a conveyer of any suitable construction. The conveyer shown in the drawings consists of two parallel endless chain belts $o$ $o$, connected at intervals by cross-bars $o'$ and passing lengthwise over guide-rails $o^2$, arranged along opposite sides of the screen, and around upper and lower sprocket-wheels $p$ $p'$ $p^2$ $p^3$, arranged at opposite ends of the screen. This conveyer is preferably driven by a chain belt $q$, passing around sprocket-wheels $q'$ $q^2$ on the driving-shaft H', and the shaft $q^3$, carrying the sprocket-wheels $p^2$ of the conveyer. As the vines are dragged over the screen by the conveyer the peas or beans drop through the perforations of the same, while the vines and pods are discharged over the tail end thereof.

In order to cause any detached peas or beans which may lodge in the vines to be shaken out of the same and discharged through the screen, an agitating mechanism is provided, which preferably consists of a number of rotary tedders, agitators, or stirrers R, arranged transversely over the separating-screen one in front of another. Each tedder consists of two heads $r$, connected by transverse slats or beaters $r'$. The tedders are turned so that their lower portions move in a direction opposite to that of the conveyer. This causes the slats of the tedders to lift and toss the vines, shaking the detached peas out of the vines and upon the screen. The several tedders are driven by a chain belt $s$, passing around active sprocket-wheels $s'$ $s^2$ on the shafts $r^2$ and the driving-shaft H' and around idle sprocket-wheels $s^3$ on the main frame.

In order to permit of varying the intensity of the agitation of the vines while the same pass over the screen, the shaft-bearings $u$ of the tedders are made vertically adjustable, preferably by means of a bolt $u'$, passing through a slotted arm $u^2$, depending from each bearing, and a slotted standard $u^3$, arranged on the side piece of the frame, as shown in Fig. 6. When the vines are thick and heavy, the tedders are lowered to agitate the same more vigorously; but when the vines are thin and light the tedders are raised for agitating the vines less vigorously.

The peas which pass through the perforations of the separating-screen N drop upon chutes V, which incline from the central portion of the screen toward both sides of the machine and discharge the peas into receptacles $v$ $v$ on opposite sides of the separator-frame.

Although I prefer the construction of the threshing apparatus shown in Figs. 1 to 7, in which the members of each pair of beaters oscillate relatively to each other, I do not wish to be understood as limiting myself to such a structure, because the same can be varied without departing from the spirit of my invention. A modification of the same is shown in Fig. 8, in which a stationary threshing member D', having a series of teeth, is arranged on one side of the vine passage or throat, while a companion toothed beater $D^2$ is arranged on the opposite side of the throat and reciprocated toward and from the opposing stationary beater. The reciprocating beater may be supported by one or more rods $w$, sliding in guides $w'$, and the same may be actuated by any suitable means.

My improved machine threshes the vines thoroughly and expeditiously, separates practically all of the peas or beans, &c., and leaves the latter in a sound and perfect condition.

I claim as my invention—

1. In a pea or bean thresher, the combination of two opposing threshing-combs, one of which is movable toward and from the other and capable of receding sufficiently to leave a discharge-throat for the vines between the combs, the teeth of each comb being arranged to enter between those of the other comb and the portions of the teeth which act upon the vines being arranged approximately parallel with said throat, whereby the vines are compressed between the front sides of the opposing teeth and bent into sinuous form when the combs approach and relax and discharged when the combs recede, and means for actuating said movable comb, substantially as set forth.

2. In a pea or bean thresher, the combination of two opposing vibratory beater-combs arranged to extend downwardly from their supporting-shafts, capable of receding sufficiently to leave a vertical dischage-throat for the vines between the same and each having its teeth arranged to enter between those of the other comb, the upper portions of the opposing teeth being arranged to converge toward said throat and their lower portions being deflected downwardly at an angle to their upper portions and adapted to compress the vines between their opposing front sides, and actuating mechanism for causing the combs to approach and recede, substantially as set forth.

3. In a thresher, the combination of a number of pairs of beaters or threshing members, one of the beaters of each pair being movable toward and from the other for opening and closing the space between the same, and actuating mechanism arranged to operate the movable beaters of alternating pairs in unison to open the same, and to simultaneously operate the movable beaters of the remaining pairs in unison to close the same, substantially as set forth.

4. In a thresher, the combination of a number of pairs of beaters arranged in succession, the opposing beaters of each pair being movable toward and from each other for opening and closing the throat between the same, and actuating mechanism arranged to operate the beaters of alternate pairs in unison to open the same, and to simultaneously operate the beaters of the remaining pairs in unison to close the same, substantially as set forth.

5. In a thresher, the combination of a number of pairs of beaters arranged one below another, the beaters of each pair being relatively movable and each beater being carried by a rock-shaft having an actuating-arm, and driving-shafts having cranks connected with said arms and arranged to vibrate the beaters of alternating pairs in unison to open the same, and to simultaneously vibrate the beaters of the remaining pairs in unison to close the same, substantially as set forth.

6. In a thresher, the combination of adjacent pairs of beaters arranged one below another, the beaters of each pair being relatively movable and each beater comprising a comb having its teeth arranged opposite the spaces between the teeth of the companion beater and strippers arranged to enter between the teeth of the beater above the same, and an actuating mechanism for said beaters, substantially as set forth.

7. In a thresher, the combination of adjacent pairs of beaters arranged one below another, the beaters of each pair being relatively movable, and each beater comprising a guide-board provided at its front edge with teeth arranged opposite the spaces between the teeth of the companion beater and strippers arranged to enter between the teeth of the beater above the same, and an actuating mechanism for said beaters, substantially as set forth.

8. In a thresher, the combination of a number of beaters arranged in successive pairs, each beater of a pair having teeth which are arranged opposite the spaces between the teeth of the companion beater, and the teeth of the beaters at the receiving end of the thresher being spaced a greater distance apart than the teeth of the beaters at the delivery end of the thresher, substantially as set forth.

9. The combination of a vertical threshing-chamber having an inlet at its upper end and a discharge at its lower end, a number of pairs of beaters arranged in the chamber one below another, each of said beaters consisting of an inclined guide-board provided at its front edge with teeth which are arranged opposite the spaces between the teeth of the companion beater and the teeth of the upper beaters being spaced a greater distance apart than those of the lower beaters, substantially as set forth.

Witness my hand this 11th day of December, 1901.

JOHN W. CARNOCHAN.

Witnesses:
THEO. L. POPP,
CARL F. GEYER.